(12) United States Patent
Hsu et al.

(10) Patent No.: US 11,097,353 B1
(45) Date of Patent: Aug. 24, 2021

(54) POWER TOOL

(71) Applicant: TECHWAY INDUSTRIAL CO., LTD., Taichung (TW)

(72) Inventors: Chih-Hua Hsu, Taichung (TW);
Chen-Chen Cheng, Taichung (TW);
Yung-Chiang Chen, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 9 days.

(21) Appl. No.: 16/835,292

(22) Filed: Mar. 30, 2020

(51) Int. Cl.
| | |
|---|---|
| B23B 31/10 | (2006.01) |
| B23B 31/06 | (2006.01) |
| B24B 23/04 | (2006.01) |
| B27B 19/00 | (2006.01) |
| B25F 3/00 | (2006.01) |

(52) U.S. Cl.
CPC .............. *B23B 31/10* (2013.01); *B23B 31/06* (2013.01); *B24B 23/04* (2013.01); *B27B 19/006* (2013.01); *B25F 3/00* (2013.01); *Y10T 279/33* (2015.01)

(58) Field of Classification Search
CPC ......... B23B 31/06; B23B 31/10; B23B 31/19; B24B 23/04; B27B 19/006; Y10T 279/33
See application file for complete search history.

(56) References Cited

U.S. PATENT DOCUMENTS

| | | | | |
|---|---|---|---|---|
| 4,575,937 A * | 3/1986 | McCullough | ......... | B26B 25/002 30/276 |
| 4,989,374 A * | 2/1991 | Rudolf | ................. | B24B 23/022 451/342 |
| 5,601,483 A * | 2/1997 | Rudolf | ................. | B24B 23/022 451/342 |
| 6,949,110 B2 * | 9/2005 | Ark | ....................... | A61B 17/142 173/217 |
| 8,187,058 B2 * | 5/2012 | Blickle | ................. | B24B 23/022 451/342 |
| 9,050,663 B2 * | 6/2015 | Zhou | ................... | B23B 31/4073 |
| 9,539,682 B2 * | 1/2017 | Kawakami | ............. | B24B 23/04 |
| 9,555,554 B2 * | 1/2017 | Thorson | ................ | B24B 45/006 |
| 9,821,430 B2 * | 11/2017 | Zhang | ....................... | B25F 5/00 |
| 10,131,032 B2 * | 11/2018 | Gao | ....................... | B24B 23/04 |
| 10,213,897 B2 * | 2/2019 | Bernardi | ............... | B24B 45/006 |
| 2010/0197208 A1 * | 8/2010 | Blickle | ................. | B24B 45/006 451/342 |
| 2020/0282539 A1 * | 9/2020 | Ikuta | ........................ | B25F 5/02 |

* cited by examiner

*Primary Examiner* — Eric A. Gates
(74) *Attorney, Agent, or Firm* — Withrow & Terranova, P.L.L.C.; Vincent K. Gustafson (57) ABSTRACT

A power tool has a clamping mechanism having an assembling mount and two clamping blocks. The assembling mount has a main body, a receiving recess defined in the main body, two first limiting troughs communicating with the receiving recess, and a through hole defined through a bottom of the receiving recess. The two clamping blocks are disposed in the receiving recess. Each one of the two clamping blocks has an abutting face corresponding to the bottom of the receiving recess in shape and facing to the bottom of the receiving recess. One of the two clamping blocks has two limiting ribs respectively inserted in the two first limiting troughs. The two limiting ribs respectively guided and blocked by the two first limiting troughs to prevent the clamping block from sliding downward along the bottom of the receiving recess.

15 Claims, 11 Drawing Sheets

POWER TOOL

BACKGROUND OF THE INVENTION

1. Field of the Invention

The present invention relates to a power tool, and more particularly to a power tool that is easy in assembling.

2. Description of Related Art

Power tools are usually powered electrically or pneumatically. A conventional power tool has a spindle, a shaft, and a tool accessory. The spindle has an installation mechanism disposed inside the spindle. The shaft is inserted inside the spindle and is clamped by the installation mechanism. The tool accessory such as a cutting blade, a sanding disk, or a grinding tool is fastened to the shaft and is driven by the spindle.

There are various kinds of installation mechanisms of the conventional power tools. One of the various kinds of the installation mechanisms fastens the shaft by a clamping manner. The conventional power tool having the installation mechanism that clamps the shaft by clamping has an assembling mount and three clamping blocks. The assembling mount has three receiving troughs for respectively receiving the three clamping blocks. Each receiving trough has a inclined bottom. One of the clamping blocks received in a corresponding one of the receiving troughs is capable of moving along the inclined bottom of the corresponding receiving trough.

When the shaft is inserted inside the assembling mount, the three clamping blocks surround the shaft and approach toward the shaft together. The shaft is clamped by the three clamping blocks and is hard to be removed from the spindle.

However, each clamping block is subjected to gravity force and slides along the inclined bottom of a corresponding one of the receiving troughs during assembly of the installation mechanism of the conventional power tool. The clamping blocks cannot be kept at determined positions and cause an assembly problem.

To overcome the shortcomings of the conventional power tool, the present invention provides a power tool to mitigate or obviate the aforementioned problems.

SUMMARY OF THE INVENTION

The main objective of the present invention is to provide a power tool that facilitates ease in assembling.

A power tool comprises a clamping mechanism having an assembling mount and two clamping blocks. The assembling mount has a main body, a receiving recess defined in the main body, two first limiting troughs communicating with the receiving recess, and a through hole defined through a bottom of the receiving recess. The two clamping blocks are disposed in the receiving recess. Each one of the two clamping blocks has an abutting face corresponding to the bottom of the receiving recess in shape and facing to the bottom of the receiving recess. One of the two clamping blocks has two limiting ribs respectively inserted in the two first limiting troughs. The two limiting ribs are respectively guided and blocked by the two first limiting troughs to prevent said one clamping block from sliding downward along the bottom of the receiving recess.

Other objects, advantages, and novel features of the invention will become more apparent from the following detailed description when taken in conjunction with the accompanying drawings.

BRIEF DESCRIPTION OF THE DRAWINGS

FIG. 4 is an exploded perspective view of the clamping mechanism in

FIG. 3;

DETAILED DESCRIPTION OF PREFERRED EMBODIMENTS

Figure 1:
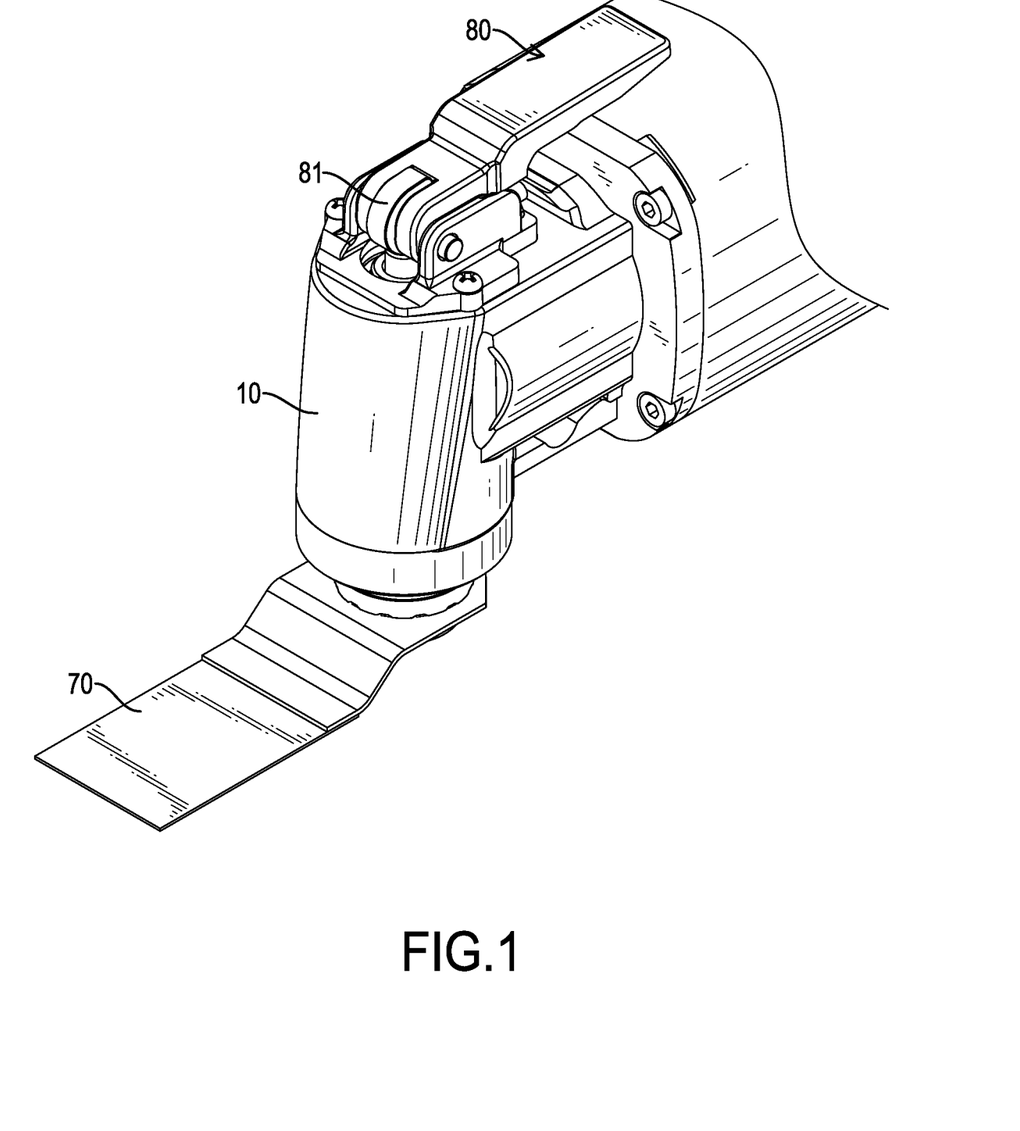
FIG. 1 is a perspective view of a power tool in accordance with the present invention.
Figure 2:
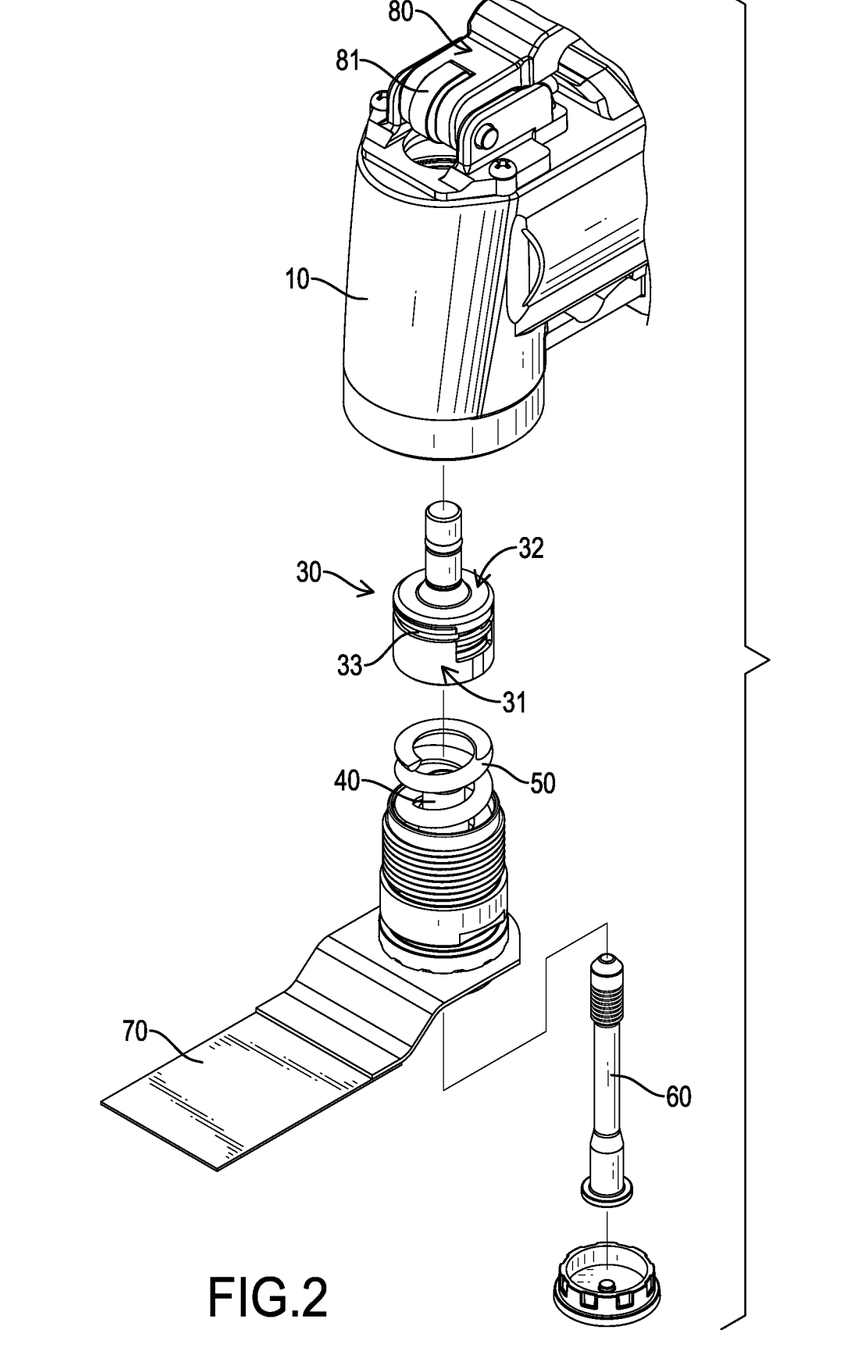
FIG. 2 is a partially exploded perspective view of the power tool in FIG. 1.
Figure 6:
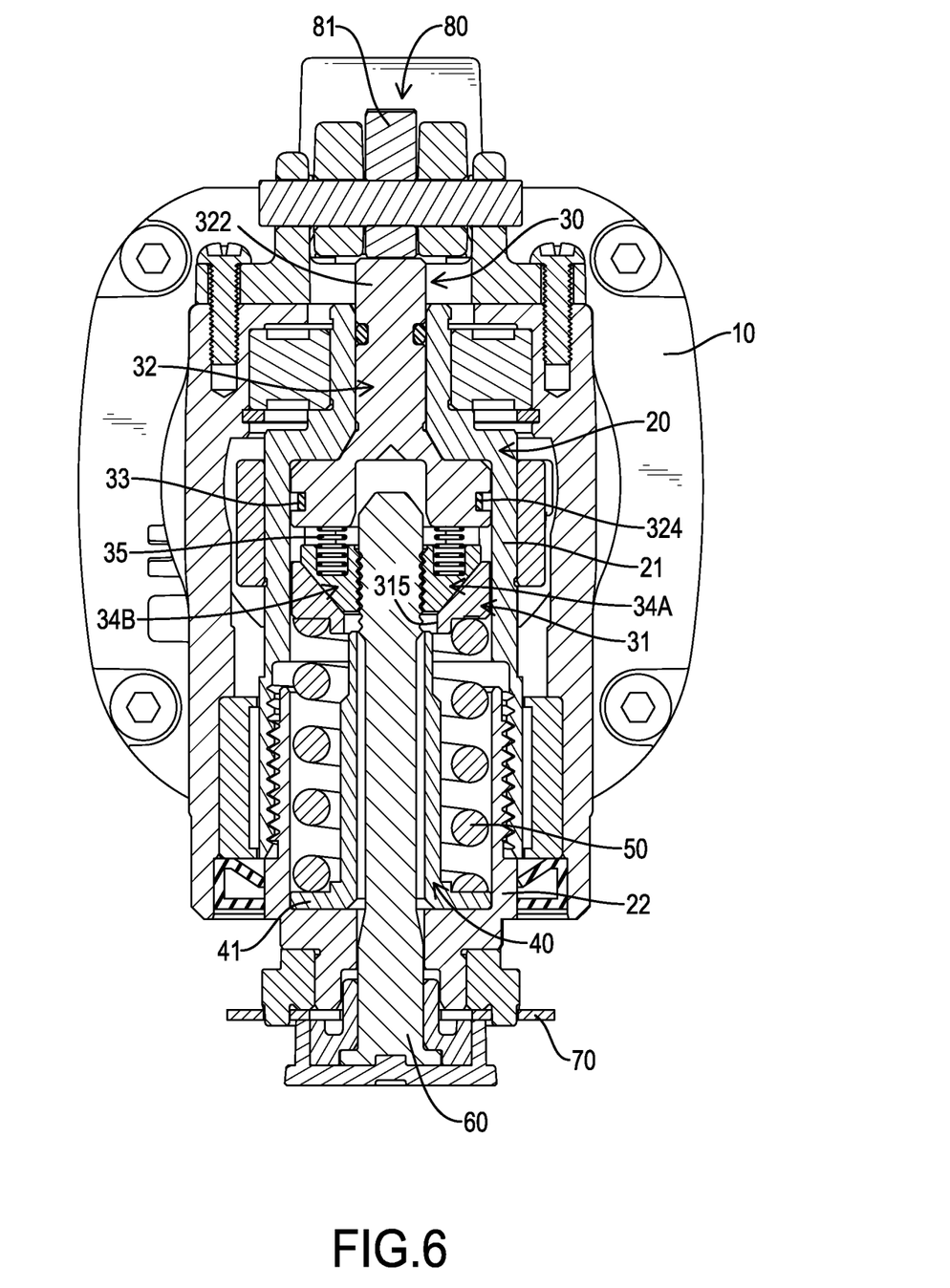
FIG. 6 is a side view in partial section of the power tool in FIG. 1.

With reference to FIGS. 1, 2, and 6, a power tool in accordance with the present invention has a housing 10, a spindle 20, a clamping mechanism 30, an ejection member 40, a major elastic unit 50, a shaft 60, a tool accessory 70, and an operating handle 80. The spindle 20 is mounted inside the housing 10. The clamping mechanism 30, the ejection member 40, and the major elastic unit 50 are mounted inside the spindle 20. The shaft 60 is inserted inside the clamping mechanism 30. The tool accessory 70 is assembled to the shaft 60. The operating handle 80 is mounted to the housing 10.

With reference to FIG. 6, the housing is hollow.

With reference to FIG. 6, the spindle 20 is hollow and has an axial direction, a first end, a second end, an upper spindle unit 21, and a lower spindle unit 22. The first end and the second end of the spindle 20 are opposite in the axial direction of the spindle 20. With the reference to FIG. 6, the first end of the spindle 20 is positioned above the second end of the spindle 20.

Figure 9:
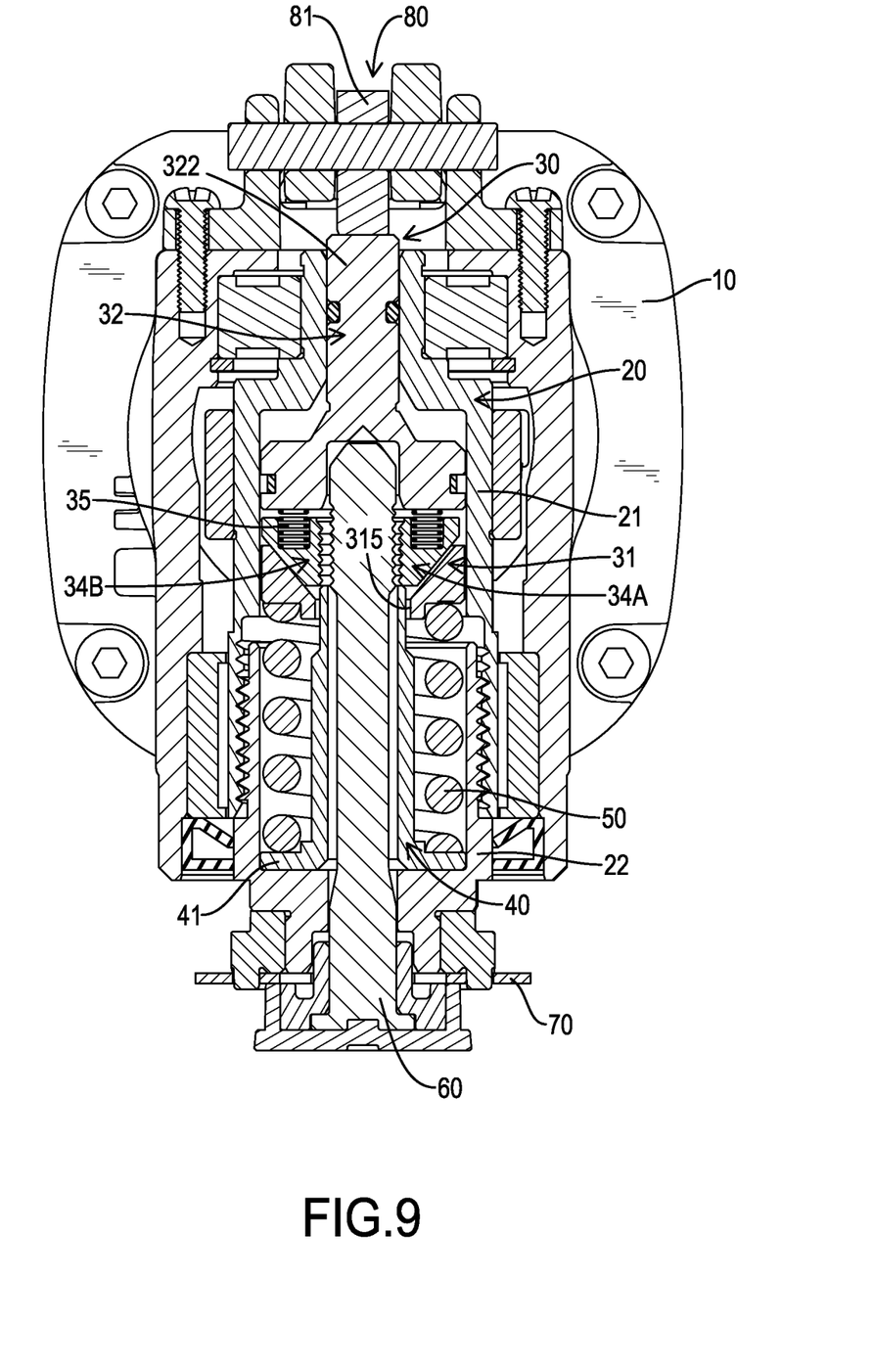
FIG. 9 is another side view in partial section of the power tool in FIG. 1.

With reference to FIGS. 2, 6, and 9, the clamping mechanism 30 disposed inside the spindle 20 can move along the axial direction of the spindle 20 and reciprocate between the first end and the second end of the spindle 20. The clamping mechanism 30 has an assembling mount 31, a linkage member 32, a hoop 33, a first clamping block 34A, a second clamping block 34B, and two auxiliary elastic units 35.

Figure 3:
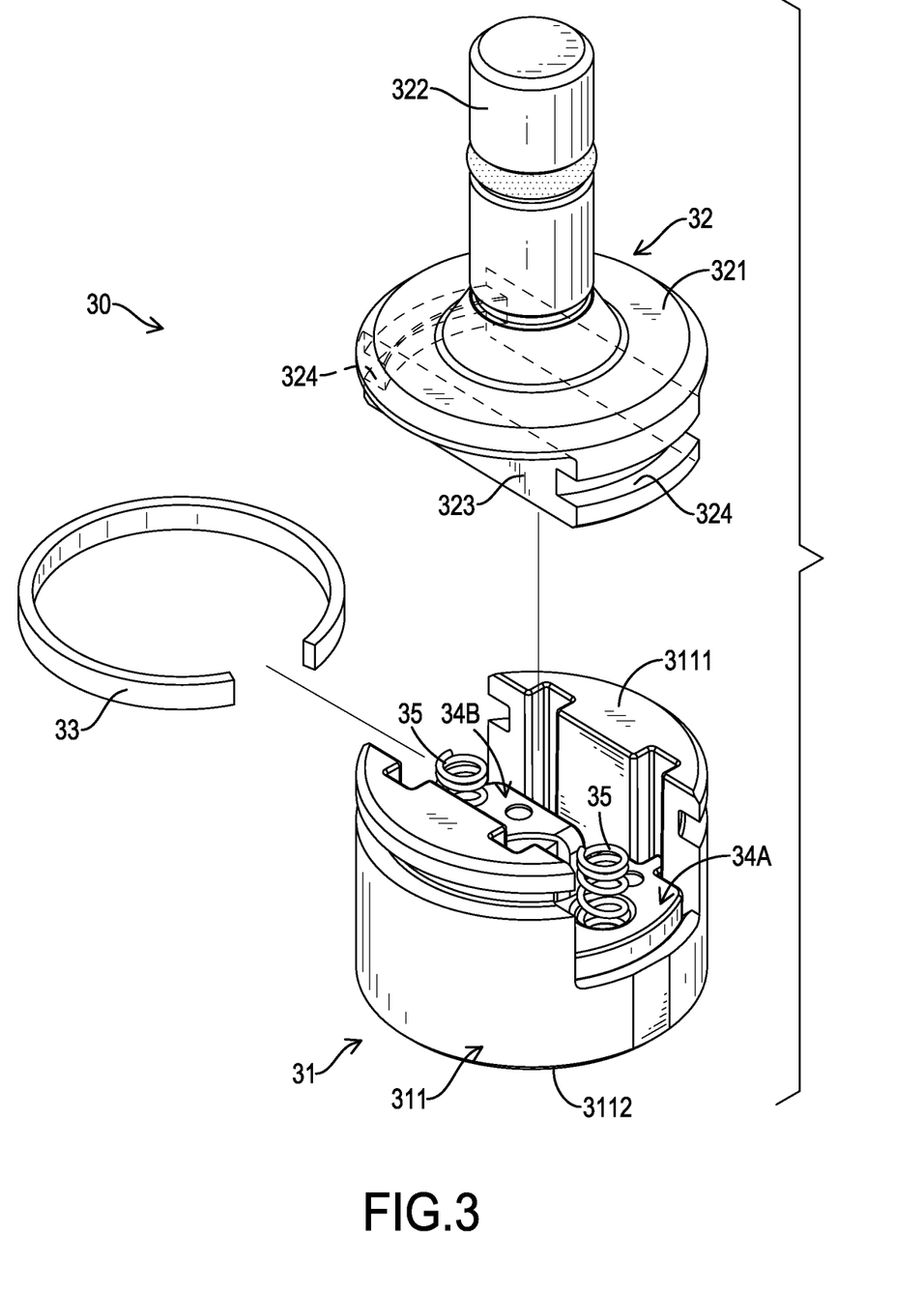
FIG. 3 is a partially exploded perspective view of a clamping mechanism of the power tool in FIG. 2.
Figure 4:
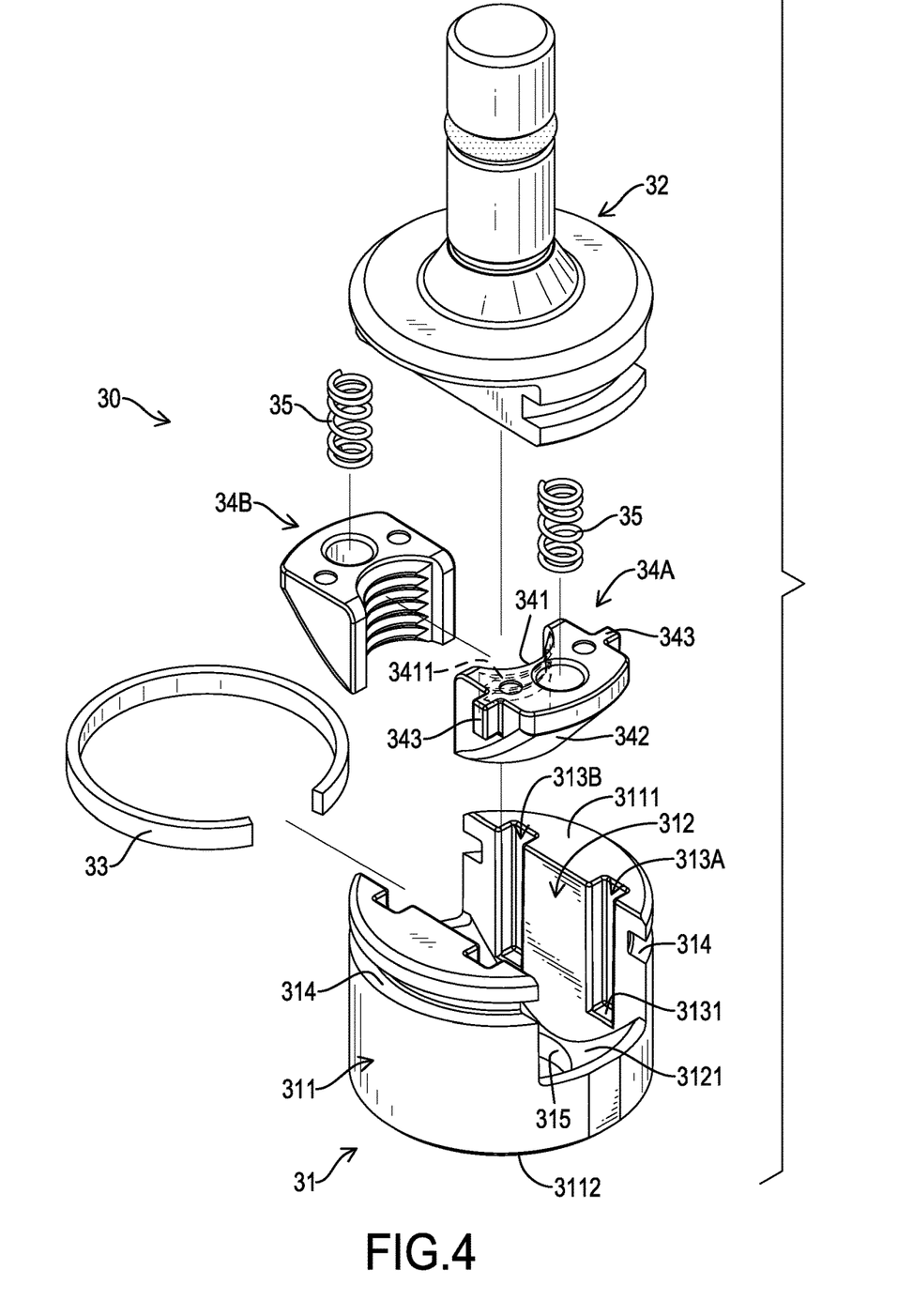
Figure 5:
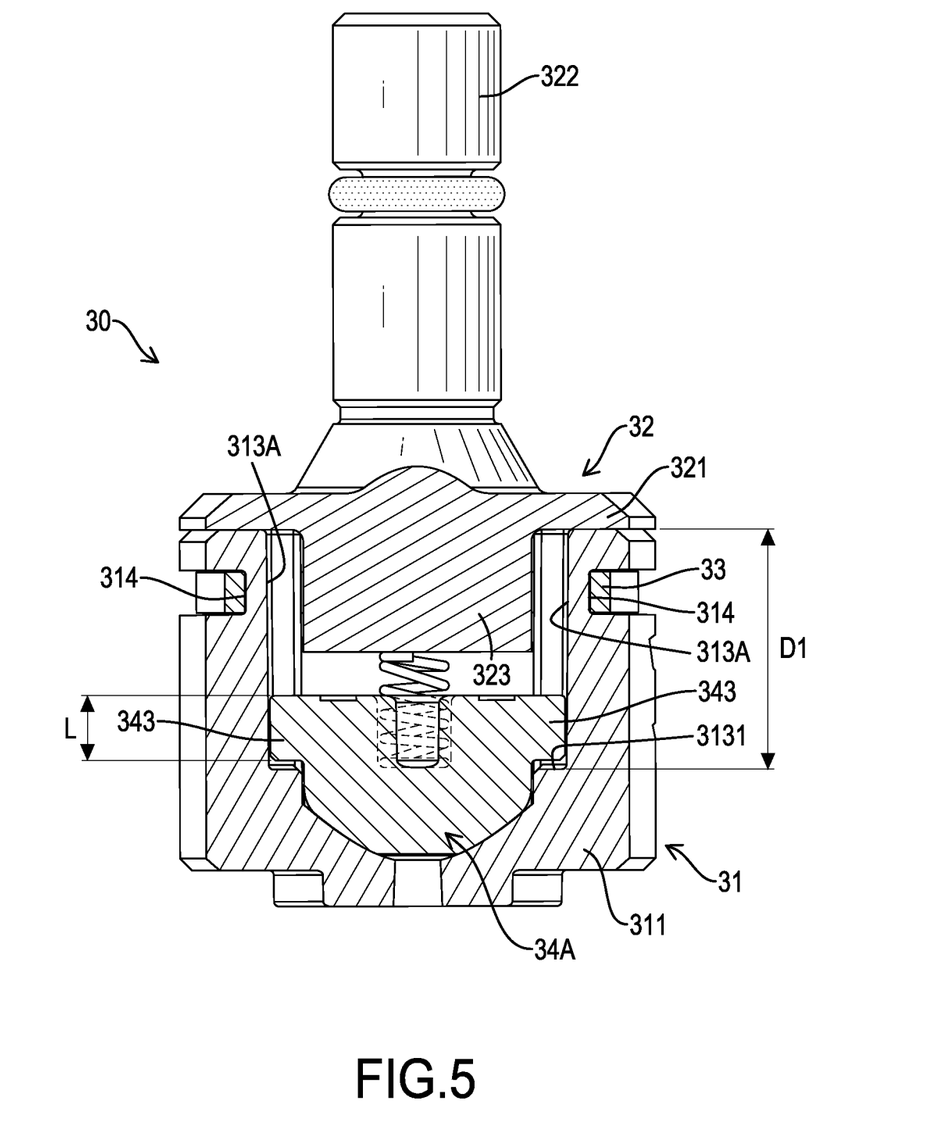
FIG. 5 is a side view in partial section of the clamping mechanism in FIG. 3.

With reference to FIGS. 3, 4, and 6, the assembling mount 31 has a main body 311, a receiving recess 312, two first limiting troughs 313A, two second limiting troughs 313B, two engaging grooves 314, and a through hole 315. The main body 311 has a peripheral surface, a first end face 3111, and a second end face 3112. The first end face 3111 and the second end face 3112 respectively face to the first end and the second end of the spindle 20. The receiving recess 312 is defined in the first end face 3111 of the main body 311 and tapers toward the second end face 3112 of the main body 311. The receiving recess 312 has an opening, a bottom 3121, and two lateral faces opposite each other. The bottom 3121 of the receiving recess 312 inclines toward the second end face 3112 of the main body 311. The two first limiting troughs 313A are respectively defined in the two lateral faces of the receiving recess 312, are in alignment with each other, and extend from the opening of the receiving recess 312 toward the bottom 3121 of the receiving recess 312. Each one of the two first limiting troughs 313A has a terminal portion 3131 disposed adjacent to the bottom 3121 of the receiving recess 312. With reference to FIGS. 5 and 6, each first limiting trough 313A has a depth D1 and a width W. The depth D1 of each first limiting trough 313A is a distance defined between the first end face 3111 of the main body 311 and the terminal portion 3131 of the said first limiting trough 313A.

With reference to FIGS. 3, 4, and 6, the two second limiting troughs 313B are respectively defined in the two lateral faces of the receiving recess 312, are in alignment with each other, and extend from the opening of the receiving recess 312 toward the bottom 3121 of the receiving recess 312 as well.

With reference to FIGS. 3 to 6, each second limiting trough 313B also has a terminal portion disposed adjacent to the bottom 3121 of the receiving recess 312, a depth, and a width. The depth of each second limiting trough 313B is a distance defined between the first end face 3111 of the main body 311 and the terminal portion of the said second limiting trough 313B.

With reference to FIGS. 3, 4, and 6, the linkage member 32 has a flange 321, a pushing pole 322, a connecting portion 323, and two engaging grooves 324. The flange 321 is shaped as a disk and has two surfaces. The pushing pole 322 protrudes from one of the two surfaces of the flange 321, extends along the axial direction of the spindle 20, and extends outside the first end of the spindle 20. The connecting portion 323 protrudes from the other surface of the flange 321. The connecting portion 323 is inserted in the receiving recess 312, and the flange 321 blocks the opening of the receiving recess 312. The two engaging grooves 324 of the linkage member 32 are formed in a peripheral surface of the connecting portion 323 and are disposed diametrically.

With reference to FIGS. 3, 4, and 5, the hoop 33 is elastic and has a notch. The hoop 33 is mounted around the assembling mount 31 and is engaged with the engaging grooves 314, 324 of the assembling mount 31 and the linkage member 32 to connect the assembling mount 31 and the linkage member 32.

With reference to FIGS. 3, 4, 5, and 7, the first clamping block 34A and the second clamping block 34B are similar in structure. The first clamping block 34A has an indentation 341, an abutting face 342, and multiple clamping grooves 3411. The multiple clamping grooves 3411 are formed in the indentation 341 of the first clamping block 34A, are disposed at intervals, and are upward arranged to a top of the first clamping block 34A. The abutting face 342 corresponds to the bottom 3121 of the receiving recess 312 in shape.

The second clamping block 34B also has an indentation, an abutting face corresponding to the bottom 3121 of the receiving recess 312, and multiple clamping grooves formed in the indentation of the second clamping block 34B.

The first clamping block 34A and the second clamping block 34B are disposed within the receiving recess 312 and the abutting face 342 of the first clamping block 34A and the abutting face of the second clamping block 34B face to the bottom 3121 of the receiving recess 312.

Figure 8:
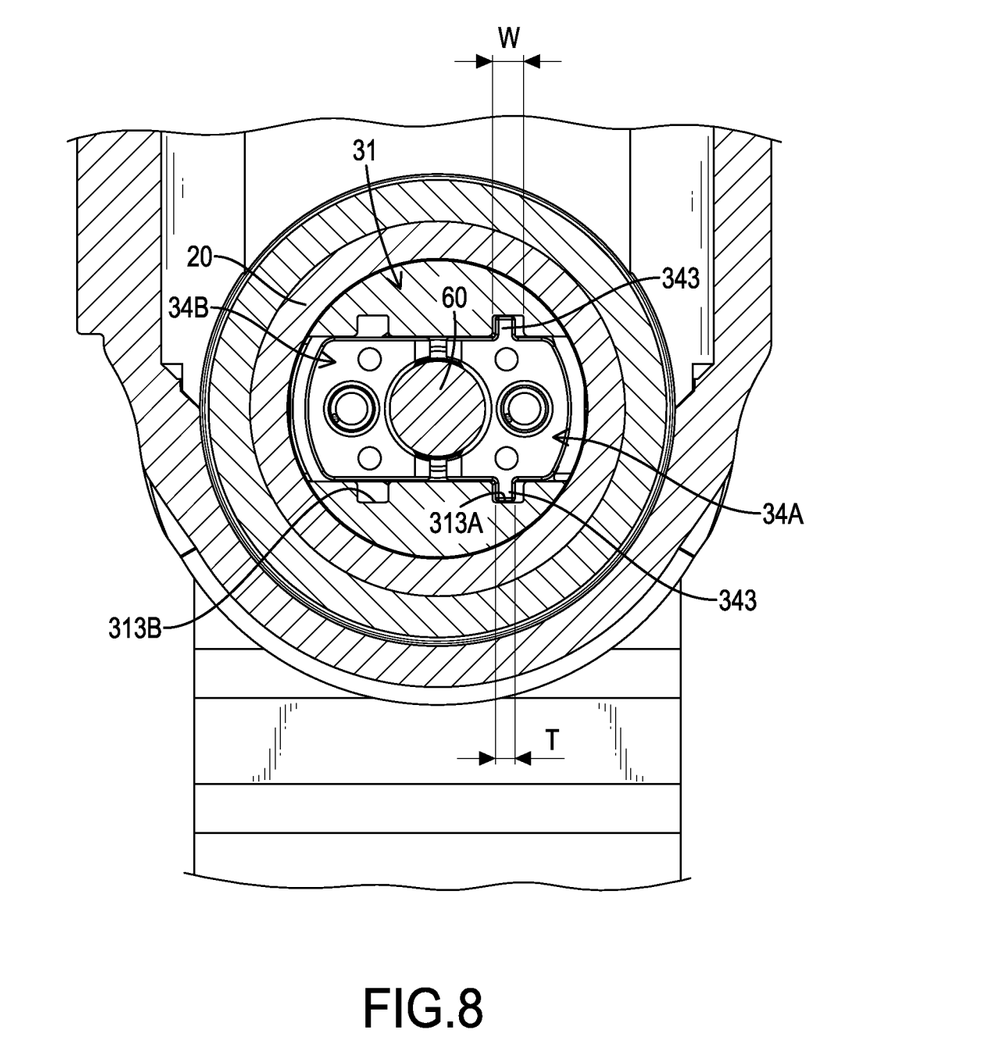
FIG. 8 is a top view in partial section of the power tool in FIG. 1.

With reference to FIGS. 4 and 8, the first clamping block 34A further has two limiting ribs 343. The two limiting ribs 343 protrude toward opposite directions and vertically extend downward. The two limiting ribs 343 of the first clamping block 34A are respectively inserted in the two first limiting troughs 313A. With reference to FIGS. 5 and 8, each limiting rib 343 has a length L and a thickness T. The length L of each limiting rib 343 is smaller than the depth D1 of each first limiting trough 313A. The thickness T of each limiting rib 343 is smaller than the width W of each first limiting trough 313A. The thickness T of each limiting rib 343 may be wider than 0.5 times the width W of each first limiting trough 313A and thinner than 0.8 times the width W of each first limiting trough 313A. In the embodiment of the present invention, the thickness T of each limiting rib 343 is 0.6 times the width W of each first limiting trough 313A. The thickness T of each limiting rib 343 may also be similar and slightly smaller than the width W of each first limiting trough 313A to allow the two limiting ribs 343 of the first clamping block 34A to move up and down respectively within the two first limiting troughs 313A.

The second limiting troughs 313B can be configured to receive the limiting ribs 343 of the first clamping block 34A as well. With the first limiting troughs 313A and the second limiting troughs 313B, the first clamping block 34A can be assembled regardless of an orientation of the first clamping block 34A. Therefore, the first limiting troughs 313A and the second limiting troughs 313B facilitate ease in assembly of the power tool in accordance with the present invention.

Figure 11:
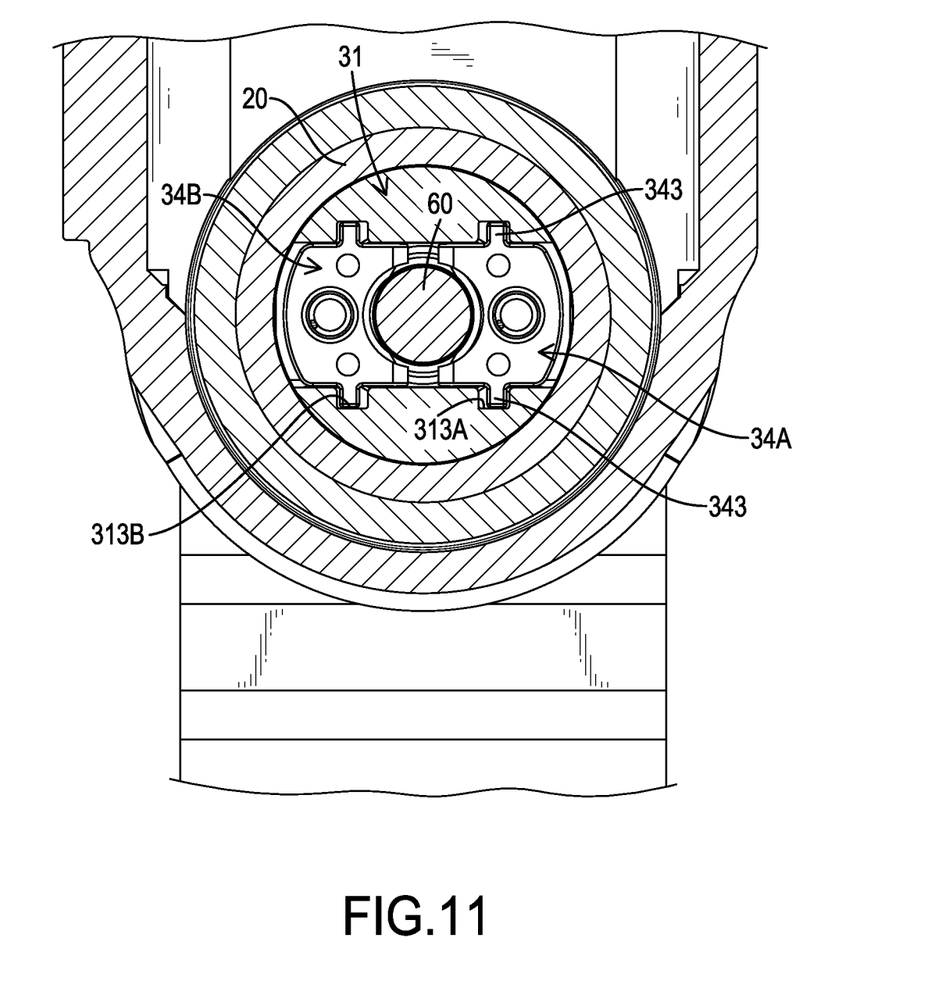
FIG. 11 is a top view in partial section of the power tool in FIG. 1 showing each clamping block having two limiting ribs.

With reference to FIG. 11, practically, the second clamping block 34B may further have two limiting ribs as well. The two limiting ribs 343 of the first clamping block 34A are respectively inserted in the two first limiting troughs 313A. The two limiting ribs of the second clamping block 34B are respectively inserted in the two second limiting troughs 313B.

With reference to FIGS. 3, 4, and 6, the two auxiliary elastic units 35 are compression springs and are disposed in the receiving recess 312. Two ends of one of the two auxiliary elastic units 35 respectively abut against the connecting portion 323 of the linkage member 32 and the first clamping block 34A. Two ends of the other one of the two auxiliary elastic units 35 respectively abut against the connecting portion 323 and the second clamping block 34B.

With reference to FIGS. 2 and 6, the ejection member 40 is tubular and has a first end, a second end, and a circular rim 41. The first end of the ejection member 40 extends toward the first end of the spindle 20, is in alignment with the through hole 315 of the assembling mount 31, and is capable of entering the through hole 315 and pushing the first clamping block 34A and the second clamping block 34B. The second end of the ejection member 40 extends toward the second end of the spindle 20. The circular rim 41 is disposed at the second end of the ejection member 40 and abuts against the lower spindle unit 22.

With reference to FIGS. 2 and 6, the major elastic unit 50 is a compression spring and has two opposite ends. The two opposite ends of the major elastic unit 50 respectively abut against the circular rim 41 of the ejection member 40 and the main body 311 of the assembling mount 31. The major elastic unit 50 presses the circular rim 41 to prevent the ejection member 40 from shaking inside the lower spindle unit 22.

Figure 7:
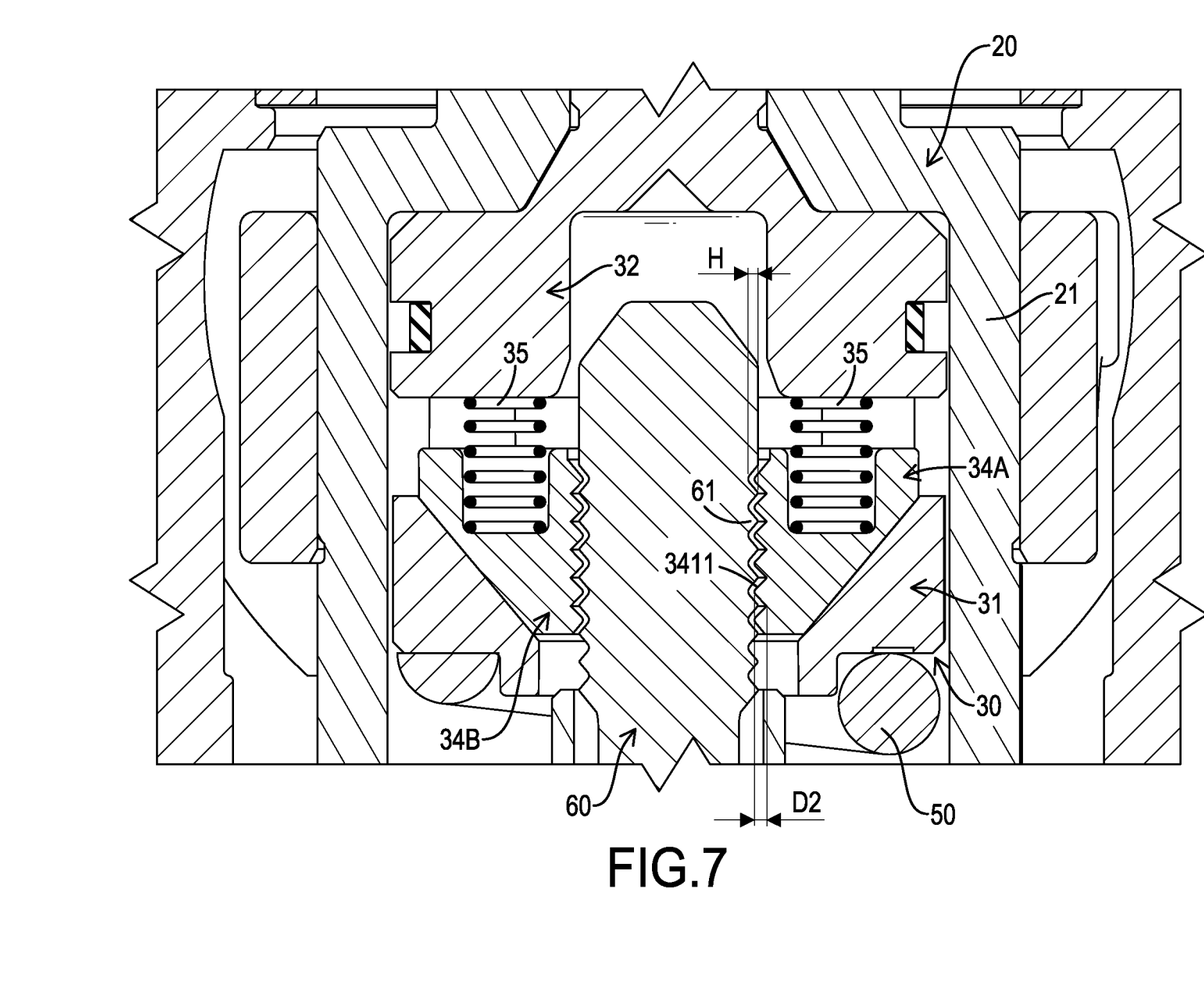
FIG. 7 is an enlarged cross sectional side view of the power tool in FIG. 1.

With reference to FIGS. 2 and 6, the shaft 60 has a connecting end, a working end, and multiple clamping protrusions 61. The connecting end and the working end of the shaft 60 are disposed opposite each other. The multiple clamping protrusions 61 are disposed adjacent to the connecting end of the shaft 60. The multiple clamping protrusions 61 are arranged at intervals along an axis of the shaft 60. Each one of the multiple clamping protrusions 61 corresponds to each one of the clamping grooves 3411 in shape, surrounds the axis of the shaft 60, and has a height H. With reference to FIG. 7, the height H of each clamping protrusion 61 is a distance defined between a root of said clamping protrusion 61 and a tip of the said clamping protrusion 61. The height H of each clamping protrusion 61 is determined according to the depth D2 of each clamping groove 3411 of the first clamping block 34A and the multiple clamping grooves of the second clamping block 34B. The height H of each clamping protrusion 61 is smaller than the depth D2 of each clamping groove 3411 of the first clamping block 34A or the depth of each clamping groove of the second clamping block 34B. The shaft 60 is inserted inside the clamping mechanism 30, enters the assembling mount 31, and is clamped by the first clamping block 34A and the second clamping block 34B. The clamping protrusions 61 of the shaft 60 are engaged with the clamping grooves 3411 of the first clamping block 34A and the clamping grooves of the second clamping block 34B to make the shaft 60 firmly connected to the clamping mechanism 30.

With reference to FIGS. 1, 2, and 6, the tool accessory 70 is fixed to the working end of the shaft 60. The tool accessory 70 can be driven by the spindle 20.

With reference to FIGS. 2 and 6, the operating handle 80 is pivotally connected to the housing 10 and has a pressing protrusion 81. With reference to FIGS. 6 and 8, the pressing protrusion 81 abuts against the pushing pole 322 of the linkage member 32.

With reference to FIG. 6, before the operating handle 80 is operated, the pressing portion 81 of the operating handle 80 just abuts against the pushing pole 322. The assembling mount 31 of the clamping mechanism 30 is abutted by the major elastic unit 50. The flange 321 of the linkage member 32 upward abut against the upper spindle unit 21 of the spindle 20.

With reference to FIGS. 6 and 8, the two auxiliary elastic units 35 downward abut the first clamping block 34A and the second clamping block 34B respectively. The first clamping block 34A and the second clamping block 34B slide along the bottom 3121 of the receiving recess 312 of the assembling mount 31. The first clamping block 34A and the second clamping block 34B approach toward each other and abut against the shaft 60. The two limiting ribs 343 of the first clamping block 34A disposed at the right side as shown in FIG. 8 are guided by the two first limiting troughs 313A to make the first clamping block 34A move steadily within the receiving recess 312. The indentation 341 of the first clamping block 34A and the indentation of the second clamping block 34B clamp the shaft 60 together. The clamping protrusions 61 of the shaft 60 are engaged with the clamping grooves 3411 of the first clamping block 34A and the clamping grooves of the second clamping block 34B to prevent the shaft 60 from moving along the axial direction of the spindle 20.

Figure 10:
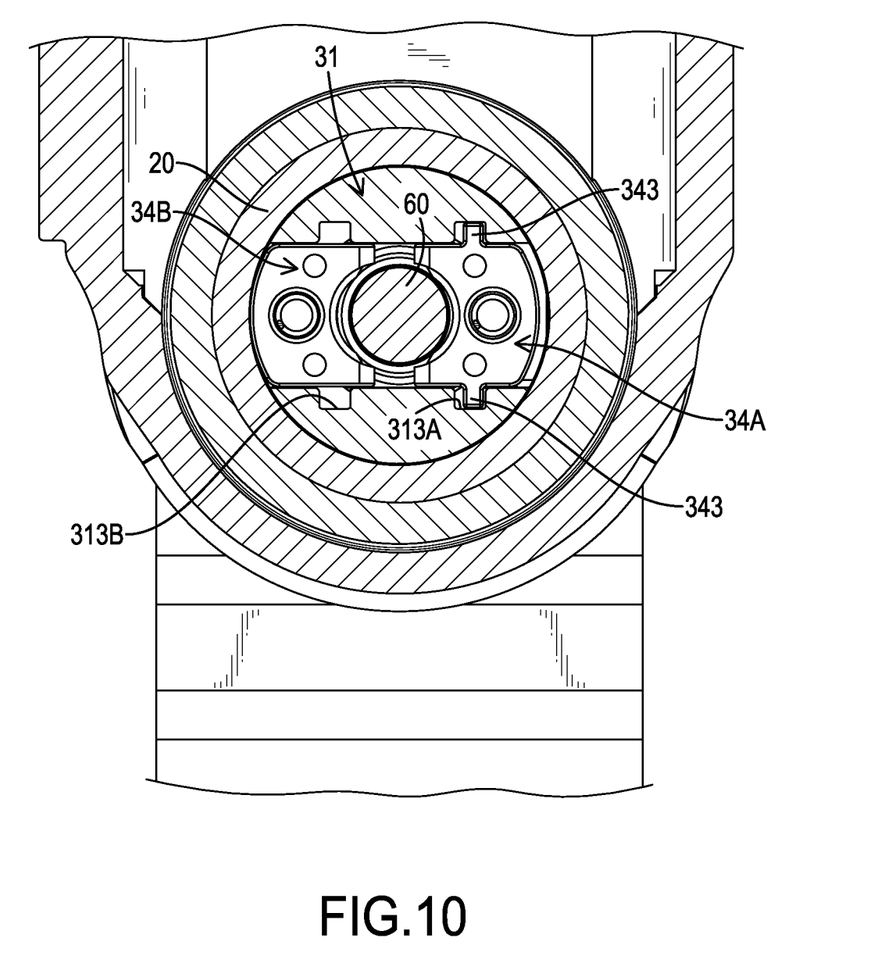
FIG. 10 is another top view in partial section of the power tool in FIG. 1.

With reference to FIGS. 9 and 10, when the operating handle 80 is operated, the operating handle 80 sweeps relative to the housing 10 and presses down the pushing pole 322 via the pressing protrusion 81. The clamping mechanism 30 presses downward the major elastic unit 50 and compresses the major elastic unit 50. The assembling mount 31 moves downward. The first end of the ejection member 40 enters the through hole 315 of the assembling mount 31 and abuts against the first clamping block 34A and the second clamping block 34B. The first clamping block 34A and the second clamping block 34B slide upward along the bottom 3121 of the receiving recess 312 and move away from the shaft 60. The shaft 60 is no longer clamped by the first clamping block 34A and the second clamping block 34B and is able to be removed from the clamping mechanism 30 accordingly. So the tool accessory 70 can be replaced. The height H of each clamping protrusion 61 of the shaft 60 is smaller than the depth D2 of each clamping groove 3411 of the first clamping block 34A and the depth of each clamping groove of the second clamping block 34B. Therefore, the first clamping block 34A can sufficiently move away from the shaft 60 to prevent the clamping protrusions 61 from being still engaged with the clamping grooves 3411 of the first clamping block 34A and the clamping grooves of the second clamping block 34B and to make sure that the shaft 60 is detachable.

When the thickness T of each limiting rib 343 is similar and is slightly smaller than the width W of each first limiting trough 313A, the first clamping block 34A can merely move up and down along the two first limiting troughs 313A. The second clamping block 34B without limiting ribs can slide along the bottom 3121 of the receiving recess 312 and upward move obliquely toward the left side as shown in FIG. 8. The shaft 60 is free from being clamped by the first clamping block 34A and the second clamping block 34B and can be removed from the clamping mechanism 30 to replace the tool accessory 70.

On the other hand, after finishing replacement of the tool accessory 70, the operating handle 80 is operated again and sweeps relative to the housing 10. The pressing protrusion 81 of the operating handle 80 no longer abuts against the pushing pole 322. The major elastic unit 50 restores and pushes the clamping mechanism 30 upward. The first clamping block 34A and the second clamping block 34B are free from being abutted by the ejection member 40. The two auxiliary elastic units 35 of the clamping mechanism 30 respectively press the first clamping block 34A and the second clamping block 34B. The first clamping block 34A and the second clamping block 34B slide downward, approach toward each other, and clamp the shaft 60 together.

When the power tool in accordance with the present invention is assembled, the limiting ribs 343 of the first clamping block 34A can be respectively blocked by the two first limiting troughs 313A to prevent the first clamping block 34A from sliding downward due to gravity. The first clamping block 34A can be kept at a determined position to avoid assemblers from repeatedly adjusting the position of the first clamping block 34A and can promote efficiency of assembly. Moreover, the limiting ribs 343 of the first clamping block 34A are guided by the first limiting troughs 313A and make the first clamping block 34A steadily move within the receiving recess 312.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A power tool comprising:
a spindle being hollow and having
an axial direction;
a first end;
a second end disposed opposite the first end of the spindle in the axial direction of the spindle; and
an upper spindle unit and a lower spindle unit connected together;
a clamping mechanism disposed inside the spindle and capable of reciprocating between the first end and the second end of the spindle along the axial direction of the spindle;
the clamping mechanism having
an assembling mount having
a main body having a first end face and a second end face respectively facing to the first end and the second end of the spindle;
a receiving recess defined in the first end face of the assembling mount, tapered toward the second end face of the main body, and having an opening, a bottom inclining to the second end face of the main body, and two lateral faces facing toward opposite directions;
two first limiting troughs respectively defined in the two lateral faces of the receiving recess, in alignment with each other, and extending from the opening of the receiving recess toward the bottom of the receiving recess, and each one of the two first limiting troughs having a width; and
a through hole defined through the bottom of the receiving recess;
a linkage member connected to the assembling mount and blocking the opening of the receiving recess;
a first clamping block disposed in the receiving recess and having
an indentation;
an abutting face corresponding to the bottom of the receiving recess in shape and facing to the bottom of the receiving recess; and
two limiting ribs protruding toward opposite directions, respectively inserted in the two first limiting troughs, and respectively guided and blocked by the two first limiting troughs, each one of the two limiting ribs having a thickness being smaller than the width of each one of the two first limiting troughs;
a second clamping block disposed in the receiving recess and having an indentation and an abutting face corresponding to the bottom of the receiving recess in shape and facing to the bottom of the receiving recess; and
two auxiliary elastic units disposed in the receiving recess, two ends of one of the two auxiliary elastic units respectively abutting the linkage member and the first clamping block, two ends of the other one of the two auxiliary elastic units respectively abutting the linkage member and the second clamping block;
an ejection member disposed in the spindle and having two opposite ends;
one of the two opposite ends of the ejection member extending toward the first end of the spindle, in alignment with the through hole, and capable of entering the through hole and pushing the first clamping block and the second clamping block;
the other one of the two opposite ends of the ejection member extending toward the second end of the spindle and abutting against the lower spindle unit;
a major elastic unit disposed in the spindle and having two opposite ends respectively abutting against the ejection member and the main body of the assembling mount; and
a shaft for installing a tool accessory inserted in the main body of the assembling mount and clamped by the indentation of the first clamping block and the indentation of the second clamping block.

2. The power tool as claimed in claim 1, wherein
the clamping mechanism has
a hoop being elastic and having a notch;
the assembling mount has
two engaging grooves formed in a peripheral surface of the main body of the assembling mount and disposed diametrically opposite;
the linkage member has
a connecting portion inserted in the receiving recess; and
two engaging grooves formed in a peripheral surface of the connecting portion and disposed diametrically opposite each other;
the hoop is mounted around the assembling mount and is engaged with the engaging grooves of the assembling mount and the linkage member.

3. The power tool as claimed in claim 2, wherein
the first clamping block has multiple clamping grooves formed in the indentation of the first clamping block, disposed at intervals, and upward arranged to a top of the first clamping block;
the second clamping block has multiple clamping grooves formed in the indentation of the second clamping block, disposed at intervals, and upward arranged to a top of the second clamping block;
each one of the clamping grooves of the first clamping block and the second clamping block has a depth;
the shaft having multiple clamping protrusions arranged at intervals along an axis of the shaft;
each one of the multiple clamping protrusions corresponds to each one of the clamping grooves in shape, surrounds the axis of the shaft, and has a height smaller than the depth of each one of the clamping grooves of the first clamping block and the second clamping blocks.

4. The power tool as claimed in claim 3, wherein the thickness of each one of the two limiting ribs of the first clamping block is wider than 0.5 times the width of each one of the two first limiting troughs and thinner than 0.8 times the width of each one of the two first limiting troughs.

5. The power tool as claimed in claim 4, wherein
the assembling mount has two second limiting troughs for receiving the two limiting ribs of the first clamping block and for conveniently assembling the first clamping block regardless of an orientation of the first clamping block;
the two second limiting troughs are respectively defined in the two lateral faces of the receiving recesses, are in alignment with each other, extend from the opening of the receiving recess toward the bottom of the receiving recess, and each one of the two second limiting troughs has a width wider than the thickness of each one of the two limiting ribs of the first clamping block.

6. The power tool as claimed in claim 4, wherein
the assembling mount has two second limiting troughs respectively defined in the two lateral faces of the receiving recesses, are in alignment with each other, extend from the opening of the receiving recess toward the bottom of the receiving recess, and each one of the two second limiting troughs has a width;
the second clamping block has two limiting ribs protruding toward opposite directions, respectively inserted in the two second limiting troughs, and respectively guided and blocked by the two second limiting troughs, each one of the two limiting ribs having a thickness smaller than the width of each one of the two second limiting troughs.

7. The power tool as claimed in claim 3, wherein the thickness of each one of the two limiting ribs of the first clamping block is 0.6 times the width of each one of the two first limiting troughs.

8. The power tool as claimed in claim 7, wherein
the assembling mount has two second limiting troughs for receiving the two limiting ribs of the first clamping block and for conveniently assembling the first clamping block regardless of an orientation of the first clamping block;
the two second limiting troughs are respectively defined in the two lateral faces of the receiving recesses, are in alignment with each other, extend from the opening of the receiving recess toward the bottom of the receiving recess, and each one of the two second limiting troughs has a width wider than the thickness of each one of the two limiting ribs of the first clamping block.

9. The power tool as claimed in claim 7, wherein
the assembling mount has two second limiting troughs respectively defined in the two lateral faces of the receiving recesses, are in alignment with each other, extend from the opening of the receiving recess toward the bottom of the receiving recess, and each one of the two second limiting troughs has a width;
the second clamping block has two limiting ribs protruding toward opposite directions, respectively inserted in the two second limiting troughs, and respectively guided and blocked by the two second limiting troughs, each one of the two limiting ribs having a thickness smaller than the width of each one of the two second limiting troughs.

10. The power tool as claimed in claim 3, wherein
the assembling mount has two second limiting troughs for receiving the two limiting ribs of the first clamping block and for conveniently assembling the first clamping block regardless of an orientation of the first clamping block;
the two second limiting troughs are respectively defined in the two lateral faces of the receiving recesses, are in alignment with each other, extend from the opening of the receiving recess toward the bottom of the receiving recess, and each one of the two second limiting troughs has a width wider than the thickness of each one of the two limiting ribs of the first clamping block.

11. The power tool as claimed in claim 3, wherein
the assembling mount has two second limiting troughs respectively defined in the two lateral faces of the receiving recesses, are in alignment with each other, extend from the opening of the receiving recess toward the bottom of the receiving recess, and each one of the two second limiting troughs has a width;
the second clamping block has two limiting ribs protruding toward opposite directions, respectively inserted in the two second limiting troughs, and respectively guided and blocked by the two second limiting troughs, each one of the two limiting ribs having a thickness smaller than the width of each one of the two second limiting troughs.

12. The power tool as claimed in claim 2, wherein
the assembling mount has two second limiting troughs for receiving the two limiting ribs of the first clamping block and for conveniently assembling the first clamping block regardless of an orientation of the first clamping block;
the two second limiting troughs are respectively defined in the two lateral faces of the receiving recesses, are in alignment with each other, extend from the opening of the receiving recess toward the bottom of the receiving recess, and each one of the two second limiting troughs has a width wider than the thickness of each one of the two limiting ribs of the first clamping block.

13. The power tool as claimed in claim 2, wherein
the assembling mount has two second limiting troughs respectively defined in the two lateral faces of the receiving recesses, are in alignment with each other, extend from the opening of the receiving recess toward the bottom of the receiving recess, and each one of the two second limiting troughs has a width;
the second clamping block has two limiting ribs protruding toward opposite directions, respectively inserted in the two second limiting troughs, and respectively guided and blocked by the two second limiting troughs, each one of the two limiting ribs having a thickness smaller than the width of each one of the two second limiting troughs.

14. The power tool as claimed in claim 1, wherein
the assembling mount has two second limiting troughs for receiving the two limiting ribs of the first clamping block and for conveniently assembling the first clamping block regardless of an orientation of the first clamping block;
the two second limiting troughs are respectively defined in the two lateral faces of the receiving recesses, are in alignment with each other, extend from the opening of the receiving recess toward the bottom of the receiving recess, and each one of the two second limiting troughs has a width wider than the thickness of each one of the two limiting ribs of the first clamping block.

15. The power tool as claimed in claim 1, wherein
the assembling mount has two second limiting troughs respectively defined in the two lateral faces of the receiving recesses, are in alignment with each other, extend from the opening of the receiving recess toward the bottom of the receiving recess, and each one of the two second limiting troughs has a width;
the second clamping block has two limiting ribs protruding toward opposite directions, respectively inserted in the two second limiting troughs, and respectively guided and blocked by the two second limiting troughs, each one of the two limiting ribs having a thickness smaller than the width of each one of the two second limiting troughs.

\* \* \* \* \*